United States Patent [19]

Wu

[11] 4,453,617
[45] Jun. 12, 1984

[54] MULTI-AXLE DRIVING MECHANISM FOR AGRICULTURAL CARRIER

[76] Inventor: C. H. Wu, Hsiang San Hsiang No. 30, Hsiang San Keng, Hsinchu, Taiwan

[21] Appl. No.: 366,940

[22] Filed: Apr. 9, 1982

[51] Int. Cl.³ .............................................. B60K 17/34
[52] U.S. Cl. ..................................... 180/247; 180/76; 180/248; 180/900
[58] Field of Search ................. 180/233, 900, 76, 244, 180/245, 246, 248, 247

[56] References Cited

U.S. PATENT DOCUMENTS

| | | | |
|---|---|---|---|
| 2,656,001 | 10/1953 | Wolf | 180/76 |
| 3,455,407 | 7/1969 | Phillips | 180/248 |
| 4,337,840 | 7/1982 | Bufler | 180/233 |

FOREIGN PATENT DOCUMENTS 55-22520  2/1980  Japan .................................. 180/233

Primary Examiner—John A. Pekar
Assistant Examiner—D. Lynn Fugate
Attorney, Agent, or Firm—Andrus, Sceales, Starke & Sawall

[57] ABSTRACT

A multi-axle driving mechanism for agricultural carrier comprising two individual transmissions driven by the same power source, one of the transmissions is secured and connected to a differential disposed between two front half driving axles each provided with a front driving wheel while the other transmission is secured and connected to a continuous rear driving axle provided with a pair of rear driving wheels; a pair of lost motion means disposed between the end of the continuous rear driving axle and the rear driving wheels; and front and rear frames respectively secured on the front and rear driving axles, and connected one with the other by means of a rotatable shaft longitudinally arranged therebetween.

3 Claims, 3 Drawing Figures

MULTI-AXLE DRIVING MECHANISM FOR AGRICULTURAL CARRIER

BACKGROUND OF THE INVENTION

The present invention relates to an agricultural carrier having two individual gear transmissions for driving all of the wheels or only two wheels of the carrier, and two frames connected one with the other by means of a rotatable shaft longitudinally superimposed thereon in order that one of the frames secured on the front driving axles provided with front wheels may be angularly moved relative to the other frame secured on the rear driving axle provided with rear wheels, so as to keep the front and rear four wheels exactly on the ground during travelling in order to increase dragging force, ground gripping force etc.

Conventional agricultural carriers such as power carts, crawlers etc. are mostly driven by a single gear box using a directional clutch engaged or disengaged inside the gear box, as well as a single driving axle. Such a single driving axle will easily be bent or broken when in operation due to the fact that there is no spring provided for transforming the short sharp jolts from the road into the soft damped oscillations, and quite a large force is transmitted to the driving axle. Furthermore, in such power carts, a single frame is supported by the front and rear axles which are provided with the wheels, hence the slipping of the wheels on the ground will easily be occurred if one of the wheels is stuck by the hole of the soft ground.

The main object of the present invention is to provide a multi-axle driving mechanism for agricultural carrier in which two sets of individual transmissions and driving axles are used in order to increase the ground gripping force, driving force and loading capacity.

Another object of the present invention is to provide a multi-axle driving mechanism for agricultural carrier in which two frames are respectively secured on the front and rear driving axles, and connected one with the other by means of a rotatable shaft longitudinally arranged therebetween in order that the front axle with wheels may be angularly moved relative to the rear axle with wheels so as to keep the front and rear wheels exactly on the ground during travelling in order to prevent the wheels from slipping on the ground.

A further object of the present invention is to provide a multi-axle driving mechanism for agricultural carrier in which a differential is used in the front driving axle, and two sets of lost motion means are disposed between the end of the continuous rear driving axle and the real driving wheels in order to let wheels run at different speeds while still driving the carrier, and to allow the carrier to make a turn.

Other objects of the present invention will become apparent from the following description.

DESCRIPTION OF THE PREFERRED EMBODIMENTS

Figure 1:
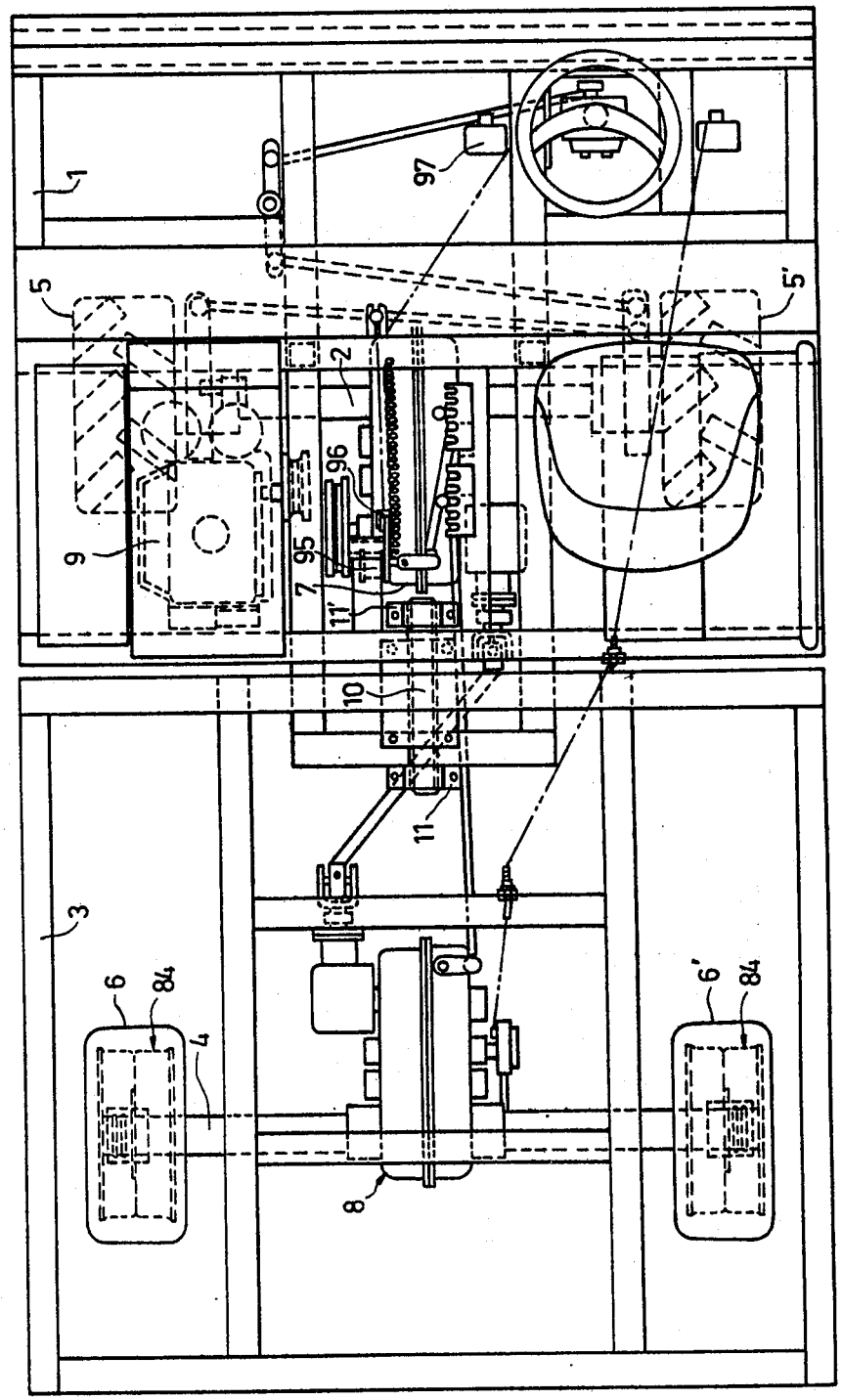
FIG. 1 is a top view of an embodiment of a multi-axle driving mechanism for an agricultural carrier in accordance with the present invention.
Figure 2:
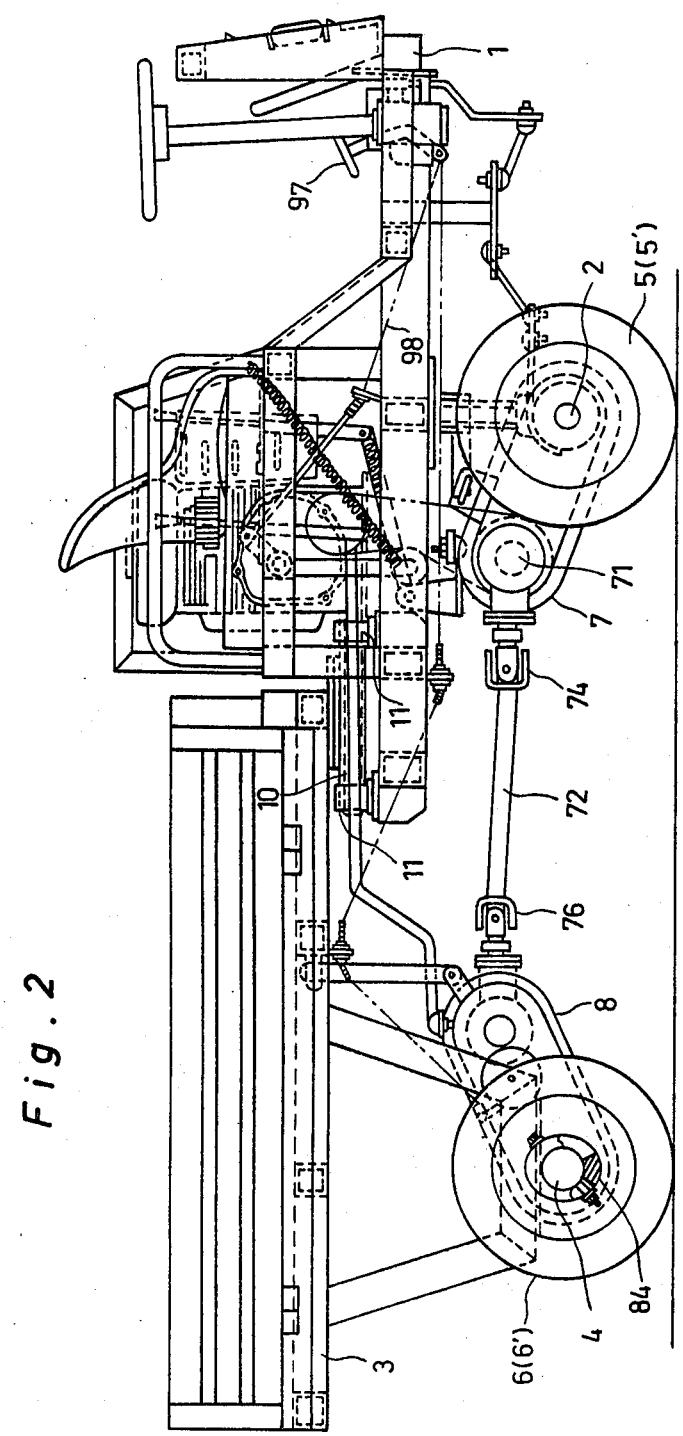
FIG. 2 is a side view of the multi-axle driving mechanism for agricultural carrier of FIG. 1.
Figure 3:
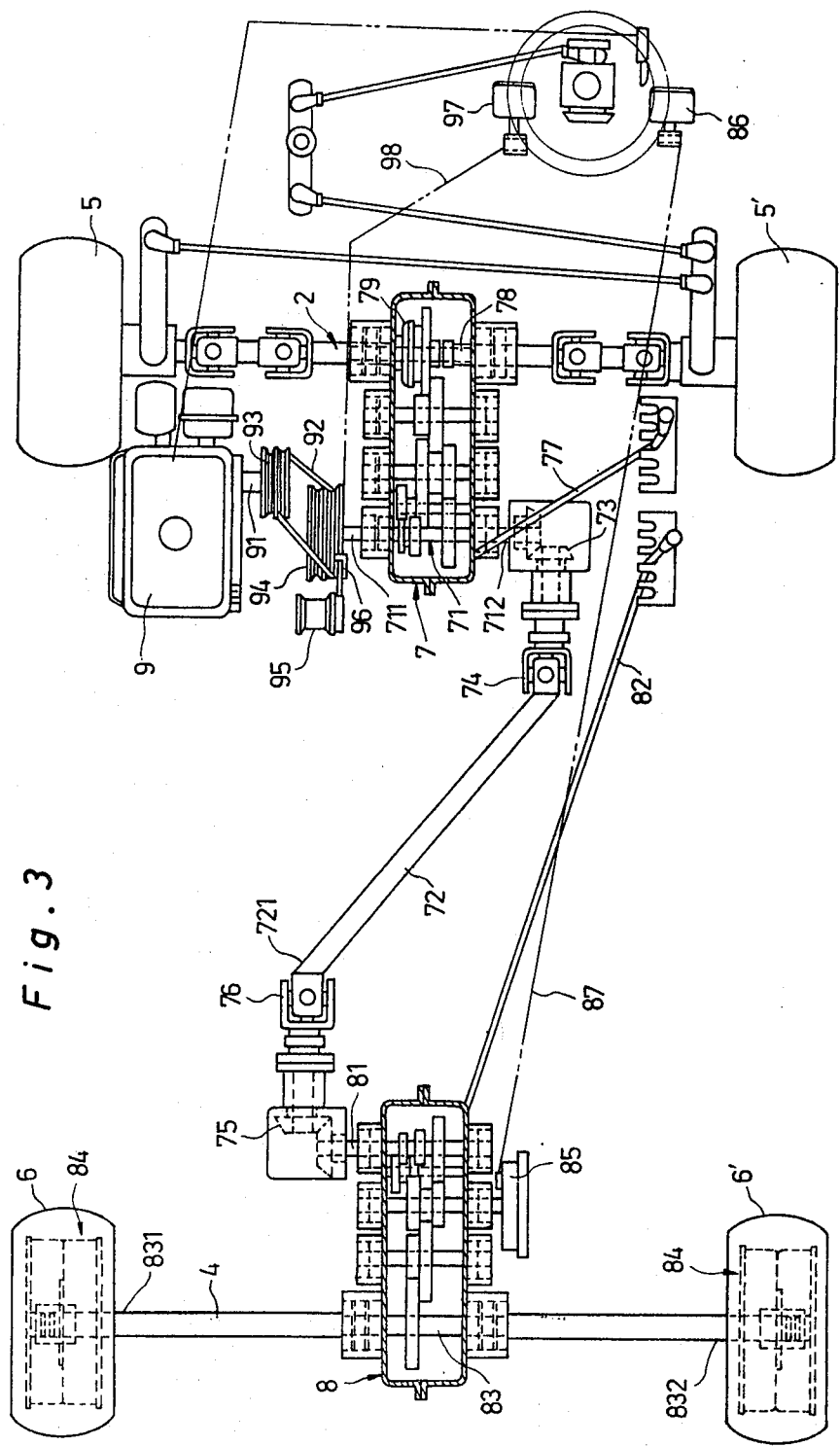
FIG. 3 is a view showing the power transmission of the multi-axle driving mechanism for agricultural carrier in accordance with the present invention.

Referring now to FIGS. 1–3, there is shown therein a multi-axle driving mechanism for an agricultural carrier comprising a front frame 1 secured on a front driving axle 2, a rear frame 3 secured on a rear driving axle 4, a pair of front wheels (5,5') are secured on the ends of the front axle 2, a pair of rear wheels (6,6') are secured on the ends of the rear axle 4, a front transmission 7 disposed at the intermediate portion of the front axle 2, a rear transmission 8 disposed on the intermediate portion of the rear axle 4, an engine 9 mounted on the front frame 1, and a shaft 10 rotatably longitudinally secured on the intermediate portion of the end of the front frame 1 by means of the two bearing (11,11'), and superimposed on the bottom of the front end of the rear frame 3 in order that the front frame secured on the front driving axle provided with front wheels may be angularly moved relative to the rear frame secured on the rear driving axle provided with rear wheels, so as to keep the front and rear wheels exactly on the ground during travelling in order to prevent the wheels from slipping on the ground, and to increase travelling stability.

Referring now to FIG. 3, the engine 9 includes a transverse output shaft 91, a belt 92 which is disposed around a pully 93 mounted on the end of the output shaft 91, and a pully 94 mounted on one end 711 of the horizontal input shaft 71 of the front transmission 7. The other end 712 of the input shaft 71 penetrates through the front transmission 7 and is connected to one end of the intermediate driving shaft 72 by means of the bevel gears 73 and universal joint 74. The other end 721 of the intermediate driving shaft 72 is also connected to one end of an input shaft 81 of the rear transmission 8 by means of the bevel gears 75 and universal joint 76.

The driving power can be transmitted from engine 9 to the input shafts 71 and 81 of the gear transmissions 7 and 8 by means of the idle-wheel clutch 95. The idle-wheel clutch 95 is secured on a braket 96 secured on the front frame 1, and connected to a foot pedal 97 through a steel wire 98 in order that the idle-wheel clutch 95 may be operated by the foot pedal to engage or disengage the belt 92. If when the idle-wheel clutch is in the disengaged position, no power can be transmitted to the input shafts 71 and 81.

The front and rear transmissions 7 and 8 may be a conventional transmission, and may be identical in construction. They are respectively controlled by the front and rear gear levers 77 and 82, and comprise an output shaft 78 (83). The output shaft 78 of the front transmission 7 serves as a front driving axle which is divided into two halves which are connected one with the other through a conventional differential 79, and have a front wheel secured on one end thereof. With this conventional differential, the front wheels can run at different speeds while still driving the carrier, in order to allow the carrier to make a turn.

The output shaft 83 of the rear transmission 8 serves as a rear driving axle which is a continuous axle, and has two wheels secured on the ends thereof. A set of conventional lost motion means (84,84') are arranged between the ends 831 and 832 of the rear driving axle 83 and rear wheels (6,6') in order to let the rear wheels run at different speeds while still driving the carrier, so as to allow the carrier to make a turn.

It should be noted that the front and rear transmissions 7 and 8 should be operated in the same speed position e.g. high speed position, low speed position or neutral position by means of the front and rear gear levers 77 and 82 in order that the front and rear wheels drive cart in the same speed, and form a multi-axle driving carrier. However, if one of the front and rear transmissions 7 and 8 is in the neutral position, the other transmission may be in any one of the speed positions to form a single axle driving carrier, or in the neutral position.

A rear brake 85 is provided on the rear transmission 8, and connected to a foot pedal 86 through the steel wire 87 in order that the rear brake may be actuated by the foot pedal 86.

I claim:

1. A multi-axle driving and support mechanism for an agricultural carrier, comprising, in combination:
   (a) longitudinally positioned front and rear frames (1,3),
   (b) motive means (9) carried on one of said frames,
   (c) front and rear transmissions (7,8) carried on said respective front and rear frames and operatively connected to said motive means,
   (d) said front transmission having a transversely extending clutchless output shaft (78) having terminus ends mounting front wheels (5,5') thereon, and with a differential (79) being disposed in said transmission output shaft to form a multi-part front driving axle (2),
   (e) said rear transmission having a transversely extending continuous unitary output shaft (83) having terminus ends mounting rear wheels (6,6') thereon, and forming a unitary rear driving axle (4),
   (f) lost-motion means (84,84') connecting said rear wheels to said continuous unitary output shaft,
   (g) and transmission control means (77,82) for selectively driving either or both said output shafts.

2. The combination of claim 1 in which said motive means (9) is carried on said front frame and wherein said combination further includes:
   (a) a drive shaft (72) of constant length extending rearwardly from said front frame (1) to said rear frame (3) and interconnecting said motive means (9) with said rear transmission (8),
   (b) and a horizontal longitudinally extending rotatable shaft (10) separate from said drive shaft (72) and mounting said front and rear frames for independent rocking of said frames about said shaft (10) to independently maintain contact of said front wheels and said rear wheels with the ground.

3. The combination of claim 2 wherein said drive shaft (72) angularly crosses said rotatable shaft (10) when viewed in plan.

* * * * *